C. T. BUSH.

Hop-Vine Support.

No. 71,128.  Patented Nov. 19, 1867.

WITNESSES:
P. N. Bouton
H. W. Mackey

INVENTOR:
Clark T. Bush

United States Patent Office.

CLARK T. BUSH, OF RENSSELAERVILLE, NEW YORK.

Letters Patent No. 71,128, dated November 19, 1867.

---

IMPROVEMENT IN HOP-VINE SUPPORTS.

---

The Schedule referred to in these Letters Patent and making part of the same.

---

TO ALL WHOM IT MAY CONCERN:

Be it known that I, CLARK T. BUSH, of Rensselaerville, in the county of Albany, State of New York, have invented a certain new and useful Improvement in Hop-Vine Supporters; and I do hereby declare that the following is a full, clear, and exact description of the same, reference being had to the accompanying drawings, making a part of this specification, in which—

Figure 1:
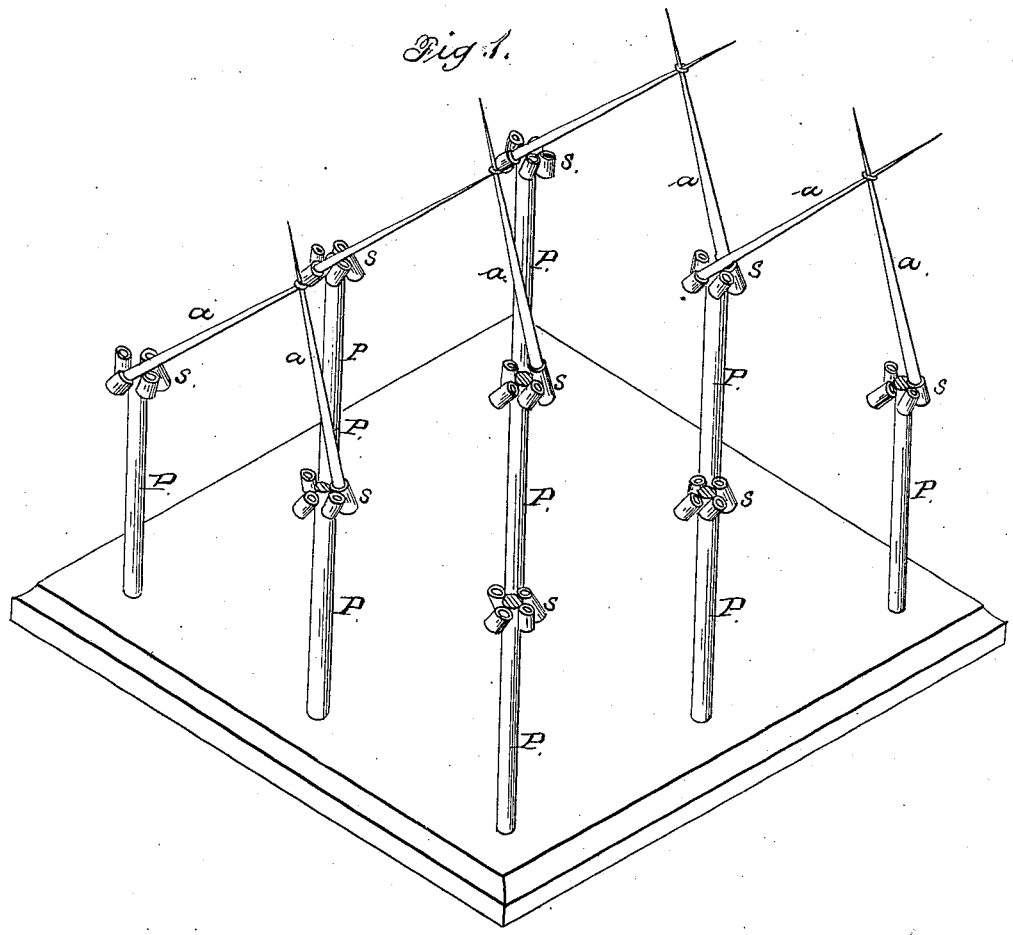

Figure 1 is a perspective view of the arrangement of poles, branches, and sockets, or caps.

Figure 2:
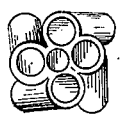

Figure 2, a top view of the connecting-cap or socket; and

Figure 3:

Figure 3, a side view of the same.

My invention consists in having one short pole at each hill of the hops, with a cap on top of said pole containing four sockets, for the purpose of holding four other smaller poles or branches in such a manner that the tops of said smaller poles may be united at their tops, or near their tops, with twine or wire, thus forming a sort of arch for the vines to run over. If the hills are six or seven feet apart, with poles six feet above the ground, and the smaller poles or branches about the same length, they would give about twelve feet for the vines to run on, while the tops of the arches would be only about ten and a half feet from the ground.

In fig. 1, $p\,p\,p$ are the short poles, placed one at each hill of the hops; $s\,s\,s$ are the caps, containing four sockets each; and $a\,a\,a$ are the smaller or additional poles, fastened at their upper ends with twine or wire. The socket $s$ has the four sockets formed so as to give four different directions to the smaller poles or branches which are placed in them. The form of the caps is more fully shown in figs. 2 and 3. By means of this cap each hill may be connected with four other hills next to it. By this arrangement the bearing portions of the vines are separated so as to allow the air to circulate and the sun to penetrate, thereby avoiding mildew and vermin, which destroy the hops. It also affords facilities for gathering the crop without removing the lower poles, the vines being cut near the cap and the branches removed for picking. The cap $s$ might be formed with one or more sockets so constructed as to allow of the additional pole or poles to be set in any direction which it might be thought desirable to train the vines. For this purpose the caps could be cast in such a shape or form as to suit any one's taste or convenience, and instead of smaller poles or branches, short arches might be used.

Having thus described my improvement, what I claim as my invention, and desire to secure by Letters Patent, is—

1. The cap $s$, provided with one or more sockets, constructed substantially as and for the purpose set forth.

2. The arrangement and combination of the short poles $p\,p\,p$, caps $s\,s\,s$, and branches $a\,a\,a$, substantially as described.

CLARK T. BUSH.

Witnesses:
P. N. BOUTON,
H. W. MACKEY.